US012620743B2

(12) United States Patent
Hasan et al.

(10) Patent No.: US 12,620,743 B2
(45) Date of Patent: May 5, 2026

(54) ACTIVE CORD CONNECTION

(71) Applicant: Cook Medical Technologies LLC, Bloomington, IN (US)

(72) Inventors: Muzammil Hasan, Winston-Salem, NC (US); Gabrielle A. Markison, Kernersville, NC (US); Jill Ivey, Winston-Salem, NC (US)

(73) Assignee: COOK MEDICAL TECHNOLOGIES LLC, Bloomington, IN (US)

(*) Notice: Subject to any disclaimer, the term of this patent is extended or adjusted under 35 U.S.C. 154(b) by 1029 days.

(21) Appl. No.: 17/743,151

(22) Filed: May 12, 2022

(65) Prior Publication Data

US 2022/0368054 A1 Nov. 17, 2022

Related U.S. Application Data

(60) Provisional application No. 63/188,775, filed on May 14, 2021.

(51) Int. Cl.
*H01R 13/26* (2006.01)
*H01R 13/187* (2006.01)

(52) U.S. Cl.
CPC ........... *H01R 13/26* (2013.01); *H01R 13/187* (2013.01); *H01R 2201/12* (2013.01)

(58) Field of Classification Search
CPC ...... H01R 13/24; H01R 13/26; H01R 13/187; H01R 11/11; F16B 5/0004; F16B 5/0008; F16B 5/0012; A61B 2018/00178
See application file for complete search history.

(56) References Cited

U.S. PATENT DOCUMENTS 2,866,172 A 12/1958 Sapper et al.
5,197,897 A 3/1993 Torok
(Continued)

FOREIGN PATENT DOCUMENTS

CH 717428 B1 * 11/2021 .......... H01R 4/4881
DE 102011088506 A1 * 6/2013 .......... H01R 13/622
(Continued)

OTHER PUBLICATIONS

"NT-300 & NT-2300 Series Single & Dual Circuit Track System & Accessories," Nora Lighting, Commerce, CA, 2010, 10 pages.

*Primary Examiner* — Jonathan P Masinick
(74) *Attorney, Agent, or Firm* — Vivacqua Crane, PLLC

(57) ABSTRACT

A system for electrically and mechanically connecting an electrical cord and a medical device includes: a cord-side connector including a cord connecting surface, a cord-side conductive portion, and at least one protrusion extending from an intermediate surface; and a device-side connector including a device connecting surface, a device-side conductive portion, and a recess configured to slidably receive the cord-side connector in a sliding direction, the recess including at least one slot configured to slidably receive the at least one protrusion to guide the cord-side connector in the recess in the sliding direction, where the at least one protrusion and slot are configured to form a mechanical connection through an interference fit upon slidable receipt of the at least one protrusion into the at least one slot, and the cord-side conductive portion and the device-side conductive portion are configured to contact each other upon formation of the interference fit.

12 Claims, 3 Drawing Sheets

(56) References Cited

U.S. PATENT DOCUMENTS

| | | | | |
|---|---|---|---|---|
| 6,099,338 | A | 8/2000 | Huang | |
| 6,350,160 | B1 | 2/2002 | Feuersanger et al. | |
| 6,736,653 | B2 | 5/2004 | Hall et al. | |
| 7,059,918 | B2 | 6/2006 | Matsumoto et al. | |
| 7,377,823 | B2 | 5/2008 | Chen | |
| 8,226,444 | B2 | 7/2012 | Chow | |
| 8,317,551 | B2 | 11/2012 | Aboulkasssem et al. | |
| 8,777,646 | B2 | 7/2014 | Doubt | |
| 9,468,498 | B2 | 10/2016 | Sigmon, Jr. | |
| 9,888,960 | B2 | 2/2018 | McLawhorn et al. | |
| 10,074,936 | B2 | 9/2018 | Dong et al. | |
| 10,515,745 | B2 * | 12/2019 | Nakamura | A61B 1/00124 |
| 10,658,802 | B2 * | 5/2020 | Schreiber | H01R 24/28 |
| 10,972,818 | B2 * | 4/2021 | Hanayama | F16B 5/10 |
| 11,103,213 | B2 * | 8/2021 | Burnside | A61B 8/4455 |
| 11,545,771 | B1 * | 1/2023 | Cook | H01R 13/5845 |
| 12,023,509 | B2 * | 7/2024 | Debock | A61N 1/36057 |
| 12,272,893 | B2 * | 4/2025 | Kubota | H01R 12/75 |
| 2005/0124200 | A1 | 6/2005 | Nudd et al. | |
| 2016/0317218 | A1 * | 11/2016 | Sigmon, Jr. | A61B 18/1492 |
| 2017/0042609 | A1 * | 2/2017 | Gittard | A61B 18/16 |
| 2020/0303862 | A1 | 9/2020 | Pachour et al. | |

FOREIGN PATENT DOCUMENTS

| | | | | |
|---|---|---|---|---|
| DE | 102019132010 | A1 * | 5/2021 | H01R 13/26 |
| EP | 0157976 | A2 * | 10/1985 | H01R 31/06 |
| EP | 3476331 | A1 * | 5/2019 | H05K 1/028 |
| WO | WO-2009000003 | A1 * | 12/2008 | E04B 1/6137 |
| WO | WO2019180620 | | 9/2019 | |

* cited by examiner

ACTIVE CORD CONNECTION

CROSS-REFERENCE TO RELATED APPLICATIONS

This application claims priority from U.S. Provisional Application No. 63/188,775, filed May 14, 2021, the entirety of which is hereby fully incorporated by reference herein.

TECHNICAL FIELD

Embodiments disclosed herein generally relate to medical devices, and more particularly to electrical connections between medical devices and removably detachable electrical cords.

BACKGROUND

Electrosurgical devices are medical devices that deliver electrical current to a treatment site within a patient for performance of an electrosurgical procedure. An electrosurgical device can be either monopolar or bipolar. In a monopolar device, the active electrical path is provided by the device, and the return path extends through an electrosurgical pad or other known method outside of the patient. In a bipolar device, both the active path and the return path are provided by device. For example, the return path is carried back through the device by a return wire.

The active and return paths are connected to a power source, which is generally a separate component from the electrosurgical device. Any of various types of electrical connections may be used to electrically connect the power source to the electrosurgical device. One type of connection to the power source is a universal pin and mating receptacle, which is generally maintained through friction, snap fit, or other mechanical-type connection. However, universal pin-and-receptacle connections are often susceptible to breaking.

Another type of connection is a coaxial cable connection. Coaxial connections are less susceptible to breaking compared to universal pin-and receptacle connections. However, a coaxial connection may have too strong of a coupling such that the connection does not break in response to inadvertent forces acting against it, which in turn may cause damage to the electrosurgical device or the power source.

Another type of connection is a magnetic connection. Magnetic connections may be disadvantageous because they are too easy to break. For example, a person in the operating room can break the connection by accidentally stepping on a portion of the cord extending on the floor during surgery while electrosurgical energy is being delivered to the patient. Such a sudden disconnection of the cabling from the device may cause harm to the patient. As such, other types of electrical connections for medical devices that overcome the above deficiencies may be desirable.

BRIEF SUMMARY

In one aspect, embodiments disclosed herein may be a system for electrically and mechanically connecting an electrical cord and a medical device.

In one form of the present disclosure, a system for electrically and mechanically connecting an electrical cord and a medical device may include: a cord-side connector including a cord connecting surface having a cord-side conductive portion, an intermediate surface extending from the cord connecting surface to an end of an elongate member of the electrical cord, and at least one protrusion extending from the intermediate surface; and a device-side connector including a device connecting surface having a device-side conductive portion and a recess configured to slidably receive the cord-side connector in a sliding direction, wherein the at least one protrusion and the at least one slot are configured to form a mechanical connection through an interference fit upon slidable receipt of the at least one protrusion into the at least one slot, and the cord-side conductive portion and the device-side conductive portion are configured to be in contact with each other upon formation of the interference fit. The recess may include at least one slot configured to slidably receive the at least one protrusion to guide the cord-side connector in the recess in the sliding direction.

In one form of the present disclosure, the cord connecting surface may extend at an angular offset from being perpendicular to a central axis.

In one form of the present disclosure, the at least one protrusion may comprise a pair of opposing planar surfaces oriented parallel with the cord connecting surface.

In one form of the present disclosure, the at least one protrusion may extend in a direction perpendicular to the sliding direction.

In one form of the present disclosure, the at least one protrusion may be made of an elastic material.

In one form of the present disclosure, the device-side conductive portion may comprise a protruding electrode.

In one form of the present disclosure, the protruding electrode may be configured as a spring-like member.

In one form of the present disclosure, the at least one slot may be tapered.

In one form of the present disclosure the intermediate surface may comprise a side surface and a stepped surface, and the side surface may extend from the cord connecting surface to the stepped surface. The at least one protrusion may extend from the side surface, and the at least one protrusion may comprise a planar surface that faces the stepped surface.

In one form of the present disclosure, the stepped surface may be parallel with the cord connecting surface.

In one form of the present disclosure, the intermediate surface may further comprise a base surface that extends from the stepped surface to the end of the elongate member of the electrical cord.

In one form of the present disclosure, the at least one protrusion may comprise a semi-circular or a semi-elliptical contour over a direction in which the at least one protrusion extends from the intermediate surface.

Certain embodiments, in another aspect, may relate to the electrical cord.

In another form of the present disclosure, an electrical cord for removable connection to a medical device may include: an elongate electrical cable; and a cord-side connector terminating the electrical cable, the cord-side connector including: a cord connecting surface and at least one conductive portion integrated with the cord connecting surface, an intermediate surface extending from the cord connecting surface to an end of the elongate electrical cable; and at least one protrusion extending from the intermediate surface, the at least one protrusion comprising a pair of opposing planar surfaces oriented parallel with the cord connecting surface.

In another form of the present disclosure, the cord connecting surface may extend at an angular offset from being perpendicular to a central axis.

In another form of the present disclosure, the at least one protrusion may be made of an elastic material.

In another form of the present disclosure, the at least one protrusion may extend in a direction perpendicular to a sliding direction.

In another form of the present disclosure, the intermediate surface may comprise a side surface and a stepped surface, and the side surface may extend from the cord connecting surface to the stepped surface. The at least one protrusion may extend from the side surface, and one of the pair of opposing planar surfaces may face the stepped surface.

In another form of the present disclosure, the stepped surface may be parallel with the cord connecting surface.

In another form of the present disclosure, the intermediate surface may further comprise a base surface that extends from the stepped surface to the end of the elongate electrical cable.

In another form of the present disclosure, the at least one protrusion may comprise a semi-circular or a semi-elliptical contour over a direction in which the at least one protrusion extends from the intermediate surface.

Other embodiments are possible, and each of the embodiments can be used alone or together in combination. Accordingly, various embodiments will now be described with reference to the attached drawings.

DETAILED DESCRIPTION

Figure 1:
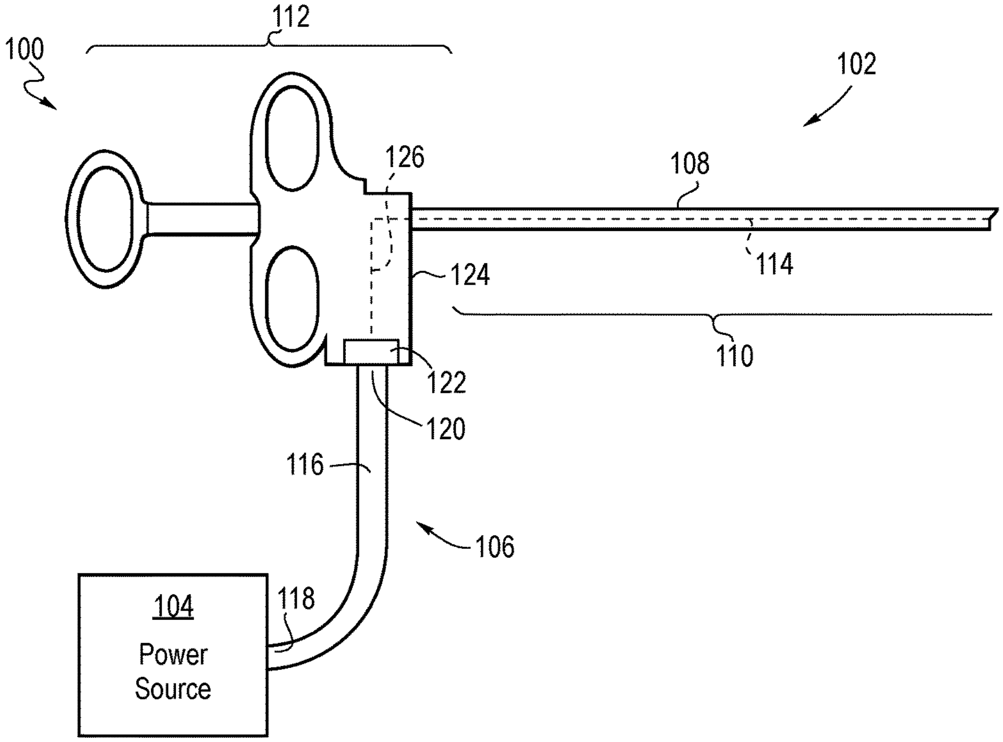
FIG. 1 shows an example medical system that may include and/or incorporate an electrical connection system of the present disclosure.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

The invention is defined by the claims, may be embodied in many different forms, and should not be construed as limited to the embodiments set forth herein; rather, these embodiments are provided so that this disclosure will be thorough and complete, and will fully convey enabling disclosure to those skilled in the art. As used in this specification and the claims, the singular forms "a," "an," and "the" include plural referents unless the context clearly dictates otherwise.

The term "configured to" is used to describe structural limitations in a particular manner that requires specific construction to accomplish a stated function and/or to interface or interact with another component(s), and is not used to describe mere intended or theoretical uses. Relative terminology and broader terms such as "about," "substantially," "generally," and other terms of degree, when used with reference to any volume, dimension, proportion, or other quantitative or qualitative value, are intended to communicate a definite and identifiable value within the standard parameters that would be understood by one of skill in the art (equivalent to a medical device engineer with experience in this field), and should be interpreted to include at least any legal equivalents, minor but functionally-insignificant variants, standard manufacturing tolerances, and including at least mathematically significant figures (although not required to be as broad as the largest range thereof). Relative terminology and broader terms will be understood by those of skill in the art as providing clear and definite scope of disclosure and/or claiming. For example, the term "substantially perpendicular" will be understood as not requiring exactly 90.00 degrees, but rather including that and functional equivalents.

FIG. 1 illustrates an example medical system 100 that may include and/or incorporate an electrical connection system of the present description. In particular, the medical system 100 includes a medical device 102, a power source 104, and an electrical connection system 106 that electrically connects the power source 104 to the medical device 102.

The power source 104 may be an electronic device configured to supply and/or output electrical power, such as in the form of electrical current and/or voltage, to the medical device 102. Non-limiting examples of the power source 104 include a radio frequency (RF) generator, an electrosurgical unit (ESU), an alternating current (AC) power supply, or a direct current (DC) power supply.

Additionally, in the example medical system 100 of FIG. 1, the medical device 102 is configured as an electrosurgical device that delivers electrical current (e.g., RF current) to a treatment site within a patient to perform an electrosurgical procedure (such as ablation, coagulation, or cutting as non-limiting examples). The electrosurgical device 102 may include an elongate tubular member 108 (e.g., a catheter) that longitudinally extends from a proximal portion 110 to a distal portion (not shown). In the present application, the terms "proximal" and "distal" should be understood as being in the terms of a physician delivering the electrosurgical device to a patient. Thus, the term "proximal" refers to a direction that is generally towards a physician during a medical procedure (e.g., meaning the portion of the electrosurgical device that is nearest to the physician), while the term "distal" refers to a direction that is generally towards a target site within a patient's anatomy during a medical procedure (e.g., meaning the portion of the electrosurgical device that is farthest from the physician). The proximal portion 110 is connected to a handle assembly 112 that a physician or other operator grasps or handles in order to operate the electrosurgical device 102. The handle assembly 112 shown in FIG. 1 has three rings for grasping with two fingers and a thumb, although any of various other types of configurations for the handle assembly 112 may be possible.

For simplicity, only the proximal portion 110 and the handle assembly 112 are shown in FIG. 1.

Also, the electrosurgical device 102 may include one or more elongate conductive members (e.g. wires) 114, longitudinally extending within or otherwise integrated with the elongate tubular member 108. The one or more conductive members 114 are configured to deliver the electrical current to the treatment site for performance of the electrosurgical procedure. In some embodiments, the electrosurgical device 102 is configured as a monopolar device, such that the one or more conductors 114 comprises only an active path, and a return path extends outside of the patient. In other embodiments, the electrosurgical device is configured as a bipolar device, such that the one or more conductors 114 comprises both an active path and a return path. Additionally, the one or more conductive members 114 may be connected to an end effector at the distal portion of the electrosurgical device (not shown) that is configured to contact or otherwise perform the electrosurgical procedure on the tissue at the treatment site. The end effector may include one or more electrodes, a cutting wire (such as for a sphincterotome), a clip, forceps, a needle knife, or a snare, as non-limiting examples.

The electrosurgical device 102 shown in FIG. 1 is just one example of a medical device 102 that may be implemented with the electrical connection system 106. Various other types of electrosurgical devices (e.g., those that do not necessarily include an elongate tubular member), and/or other non-electrosurgical medical devices that otherwise receive electrical power to operate and/or perform an operation, may be used with the electrical connection system 106.

As mentioned, the electrical connection system 106 may be configured to electrically connect the power source 104 to the medical device 102, and deliver electrical power from the power source 104 to the medical device 102. As shown in FIG. 1, the electrical connection system 106 may include an electrical cable or cord 116 extending from a first end 118 to a second end 120. The first end 118 is configured to physically and electrically connect to the power source 104, and the second end 120 is configured to physically and electrically connect to the medical device 102. When the first end 118 is connected to the power source 104 and the second end 120 is connected to the medical device 102, the medical device 102 and the power source 104 are electrically connected to each other via the electrical connection system 106, and the power source 104 is able to deliver electrical power to the medical device 102 via the electrical connection system 106.

Figure 2:
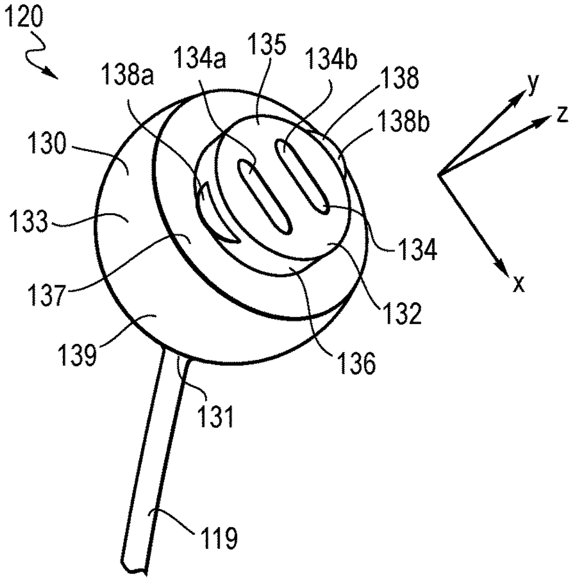
FIG. 2 shows a perspective view of an example embodiment of a cord-side connector.

The cord 116 may further include an elongate member 119 (e.g., as shown in FIG. 2) extending between the first end 118 and the second end 120. In general, the elongate member 119 includes an elongate outer sheath made of a non-conductive or insulating material, and one or more conductive members, such as wires, extending within the outer sheath. The one or more conductive members delivers the electrical power between the first and second ends 118, 120.

In some embodiments, the first end 118 has a fixed connection or attachment to the power source 104. In other embodiments, the first end 118 has a removable connection or attachment to the power source 104. As used herein, a removable connection between two components means that the components are designed and intended to be attached to and detached from each other any number of times (such as via a plug-and-socket connection for example) during normal use and operation of the components. As a non-limiting example, a removable connection may be formed using an interference fit or a friction fit between the two components, such as a plug-and-socket configuration for example. In addition, a fixed connection between two components means that the components are designed and intended not be detached or separated from each other during normal use and operation of the system. A fixed connection may be formed by soldering or welding, or by bonding with an adhesive, the two components together, as non-limiting examples.

In addition, the second end 120 may be configured to be removably connected to the medical device 102. The second end 120 may be configured as a cord-side connector or connecting portion 120 that is able to removably mate with a corresponding device-side connector or connecting portion 122 in order to form the removable connection. In the embodiment shown in FIG. 1, the device-side connector 122 is implemented on, or as part of, a housing 124 of the handle assembly 112. In other embodiments, the device-side connector 122 is implemented with another or different component of the medical device 102 other than the handle housing 124, such as a housing or other outer part that is not considered part of the handle assembly 112. In still other embodiments, the device-side connector 122 is a standalone component of the medical device 102 (i.e., a component that is not considered part of another component of the medical device 102). Regardless of how the device-side connector 122 is implemented in the medical device 102, in various embodiments, the medical device 102 may include one or more conductive components 126, such as within the housing 124, that electrically connects the cord-side connector 120 of the cord 116 to the elongate conductive members 114 when the cord-side connector 120 is connected to the device-side connector 122. Additionally, in any of various embodiments, the device-side connector 122 may be considered a component of the electrical connection system 106, or alternatively a component of the medical device 102 to which the electrical connection system 106 removably connects.

Through the removable connection, when the cord-side connector 120 is connected to the device-side connector 122, the electrical connection system 106 is electrically connected to the medical device 102. For embodiments where the medical device 102 is an electrosurgical device, such as the one shown in FIG. 1, when the cord-side connector 120 is connected to the device-side connector 122, the electrical connection system 106 is electrically connected to the one or more elongate conductive members 114, and in turn configured to deliver electrical power to the one or more elongate conductive members 114.

Various other embodiments of the medical system 100 may include fewer components than all of the medical device 102, the power source 104, and the electrical connection system 106. For example, various other embodiments may include only the electrical connection system 106, only the cord 116 of the electrical connection system 106, only the medical device 102 including the device-side connector 122, only the cord 116 and only a part of the medical device 102 that incorporates the device-side connector 122 (e.g., the handle assembly 112 without the elongate tubular member 108), only the power source 104 and the electrical connection system 106, or only the power source 104 and the cord 116.

FIG. 2 is a perspective view of an example embodiment of the cord-side connector 120 in more detail. The cord-side connector 120 may include a cord connector housing 130 that connects to an end 131 of the elongate member 119. The cord connector housing 130 is made of a non-conductive and/or insulating material and includes a plurality of outer surfaces generally defining an outer contour or shape of the cord-side connector 120. The outer surfaces may include a cord connecting surface 132 and an intermediate surface 133 extending from the cord connecting surface 132 to the end 131 of the elongate member 119. The cord connecting surface 132 is an outer surface of a cord connecting portion of the housing 130, and the intermediate surface 133 is an outer surface of an intermediate portion of the housing 130. The intermediate portion may include a base that connects to the end 131 of the elongate member 119.

Figure 3A:
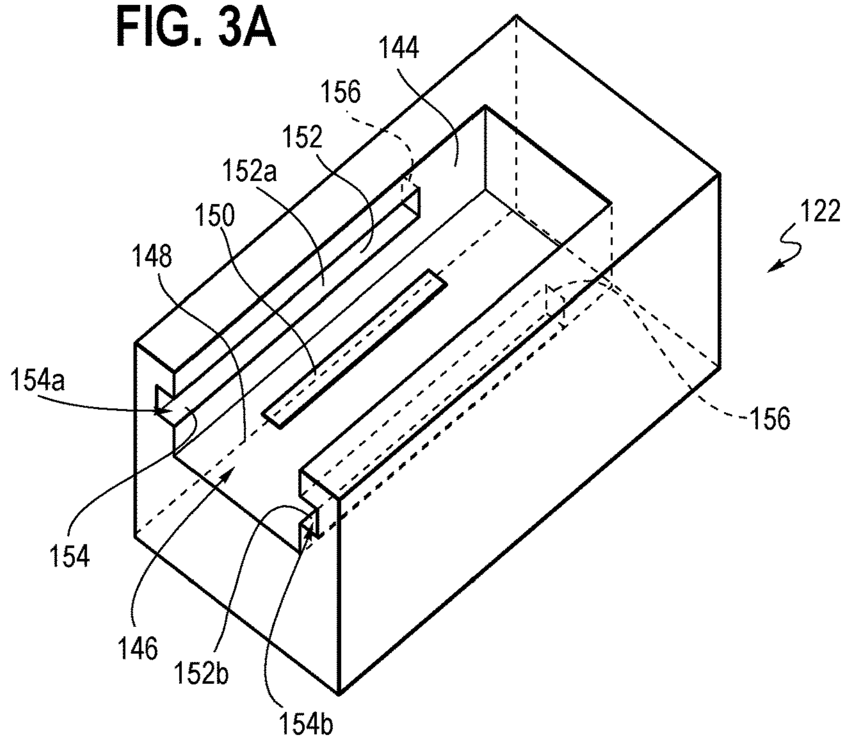
FIG. 3A shows a perspective view of an example embodiment of a device-side connector that may engage with the cord-side connector of FIG. 2.

The cord connecting surface 132 is a surface of the cord connector housing 130 that includes, or is integrated with, a cord-side conductive portion 134 that is configured to electrically and physically connect to a corresponding device-side conductive portion 150 (e.g., as shown in FIG. 3A) of the device-side connector 122, as described in further detail below. In various embodiments such as shown in FIG. 2, the cord-side conductive portion 134 is configured as a generally flat structure oriented parallel with a non-conductive portion 135 of the cord connecting surface 132. In some embodiments such as shown in FIG. 2, the flat cord-side conductive portion 134 may be flush or co-planar with the non-conductive portion 135. In other embodiments, the flat cord-side conductive portion 134 is slightly recessed relative to the non-conductive portion 135. In still other embodiments, the flat cord-side conductive portion 134 slightly protrudes relative to the non-conductive portion 135.

The cord-side conductive portion 134 may integrate with the non-conductive portion 135 in any of various ways. For at least some embodiments, the conductive portion 134 is a conductive element, such as a conductive trace, formed on a surface of a printed circuit board (PCB). The non-conductive portion 135 may cover the PCB except for the conductive portion 134, such that the conductive portion 134 is an exposed portion of the PCB. In this way, the non-conductive portion 135 functions as a protection or protective cover of the PCB.

Additionally, for at least some embodiments such as shown in FIG. 2, the conductive portion 134 includes a plurality of conductive elements. FIG. 2 shows two conductive elements 134*a*, 134*b*, although more than two conductive elements may be possible for other embodiments. The conductive portion 134 may include a plurality of conductive elements for bipolar configurations, where one of the conductive elements (e.g., 134*a*) is part of an active path of the cord 116, and another conductive element (e.g., 134*b*) is part of a return path of the cord 116. In other embodiments, the cord 116 may include two separate return paths, such that the number of conductive elements is three—a first conductive element that is part of the active path, a second conductive element that is part of a first return path, and a third conductive element that is part of a second return path. In still other embodiments, the cord 116 may have a monopolar configuration, such that the conductive portion 134 includes only a single conductive element that is part of the active path of the cord 116. For embodiments where the cord-side conductive portion 134 includes multiple conductive elements, the non-conductive portion 135 may separate and electrically isolate the conductive elements from each other.

Additionally, the cord connecting surface 132 may be a surface of the cord connector housing 130 that is furthest away from the end 131 of the elongate member 119. The intermediate surface 133 functions or serves as a connective surface that connects the cord connecting surface 132 to the end 131. In combination, the cord connecting surface 132 and the intermediate surface 133 houses internal conductive elements that electrically connect the cord-side conductive portion 134 to conductive members of the elongate member 119, and forms an outer surface that is configured to engage with the device-side connector 122.

In various embodiments such as shown in FIG. 2, the intermediate surface 133 may itself include a plurality of surfaces (or surface portions) that may extend in different planes and/or meet at edges. For example, as shown in FIG. 2, the intermediate surface 133 may include a side surface 136, a stepped surface 137, and a base surface 139. The side surface 136 extends between the cord connecting surface 132 and the stepped surface 137. In particular embodiments such as shown in FIG. 2, the stepped surface 137 is substantially parallel with the cord connecting surface 132, and the side surface 136 extends substantially perpendicular to the cord connecting and stepped surfaces 132, 137. The base surface 139 extends from the stepped surface 137 to the end 131 of the elongate member 119, and is a generally curved surface that tapers as it extends from the stepped surface 137 to the end 131. Various other configurations for the intermediate surface 133, including those where the intermediate surface has only a single smooth surface, may be possible, without departing from the scope of the present invention.

Figure 4A:
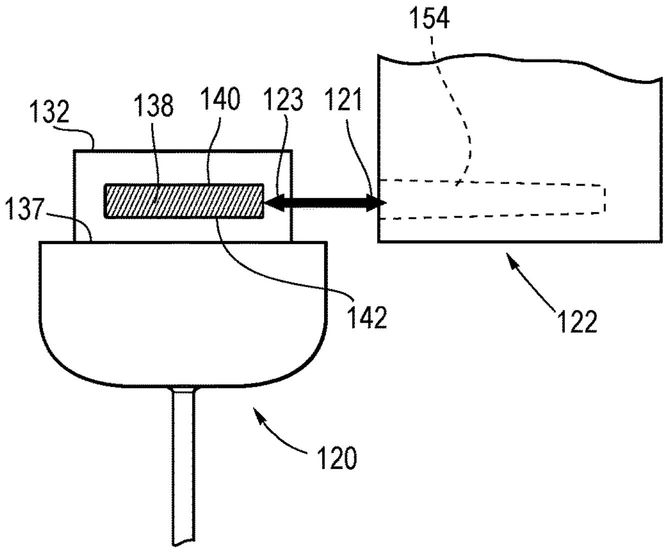
FIG. 4A shows a cord-side connector and a device-side connector disconnected from each other.
Figure 4B:
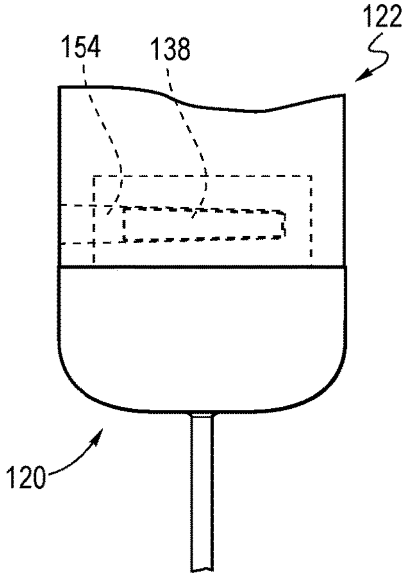
FIG. 4B shows the cord-side connector and the device-side connector of FIG. 4A connected to each other.

Referring briefly to FIGS. 4A and 4B, the cord-side connector 120 and the device-side connector 122 move relative to each other in order to attach and detach the cord 116 to/from the medical device 102. As described in further detail below, when the cord-side connector 120 and the device-side connector 122 are separated from each other, the cord-side connector 120 may connect to the device-side connector 122 by moving closer to the medical device 102 in a cord-attachment direction 121. Upon initial engagement with the device-side connector 122, the cord-side connector 120 continues to move in the cord-attachment direction 121 relative to the medical device 102 until the cord-side connector 120 reaches a final connection position in the device-side connector 122, at which point the cord-side and device-side connectors 120, 122 are in mechanical and electrical contact with each other. Similarly, when the cord-side connector 120 is attached to the device-side connector 122, in order to detach the cord-side connector 120 from the device-side connector 122, the cord-side connector 120 may move in a cord-detachment direction 123 relative to the device-side connector 122 until the cord-side connector 120 is completely detached from (e.g., entirely no longer in contact with) the device-side connector 122. The cord-attachment direction 121 and the cord-detachment direction 123 are opposite from each other, as indicated by the double-sided arrow shown in FIG. 4A.

For simplicity, and unless expressly used otherwise herein, the cord-attachment direction and the cord-detachment direction are collectively referred to herein as a sliding direction. As described in further detail below, the cord-side connector 120 and the device-side connector 122 are configured to slidably engage with each other, in that they have respective surfaces that are configured to slide over each other upon contact in order for the cord-side connector 120 and the device-side connector 122 to move relative to each other when engaged.

Referring back to FIG. 2, the cord-side connector 120 further includes at least one protrusion (or flange) 138 that protrudes or extends from the intermediate surface 133 of the cord connector housing 130. The at least one protrusion 138 is configured to guide the cord-side connector 120 in the sliding direction to facilitate the connection and disconnection between the cord-side and device-side connectors 120,

122. By guiding in the sliding direction, the at least one protrusion 138 limits the relative movement of the cord-side connector 120 and the device-side connector 122 when they are engaged with each other to the sliding direction.

In at least some example embodiments such as shown in FIG. 2, the at least one protrusion 138 may include a plurality, such as a pair, of protrusions 138*a*, 138*b*, each extending and/or protruding from the intermediate surface 133. In particular embodiments, the protrusions 138*a*, 138*b* may be disposed on opposing portions of, and extend or protrude in opposite directions from, the intermediate surface 133. To illustrate, suppose a Cartesian coordinate system including x, y, and z axes perpendicular to each other, as shown in FIG. 2. Further suppose that the cord-side connector 120 is centrally positioned about a central axis, such as the z-axis, where the cord connecting surface 132 faces in a direction aligned or in parallel with the central axis. In addition, the sliding direction is along the x-axis. The protrusions 138*a*, 138*b* extend in opposite directions from each other along the y-axis, i.e., an axis that is perpendicular to the central axis (z-axis) and the sliding direction (x-axis). The directions in which the protrusions 138*a*, 138*b* extend or protrude may be defined in various ways, such as a direction in alignment or parallel with a line connecting points of respective protrusions 138*a*, 138*b* furthest away from the central (z) axis, a line connecting centroids of the respective protrusions 138*a*, 138*b*, or a line connecting midpoints of the respective protrusions 138*a*, 138*b* where they connect to the intermediate surface 133.

Additionally, for at least some embodiments such as shown in FIGS. 2 and 4A, the at least one protrusion 138 may be a generally planar structure having two opposing planar surfaces 140, 142. One of the planar surfaces may face in the same direction as the direction in which the cord connecting surface 132 faces, and the other of the planar surfaces may face in the opposite direction from the direction in which the cord connecting surface 132 faces.

Additionally, in various embodiments such as shown in FIG. 2, each protrusion 138*a*, 138*b* may have a semi-circular or semi-elliptical shape or contour over the direction in which it extends from the intermediate surface 133. Various other shapes are possible in any other of various embodiments, without departing from the scope of the present invention. For example, the protrusions 138*a*, 138*b* may be polygonal, such as rectangular or square as non-limiting examples, or otherwise have shapes with straight edges and corners, or a combination of straight and curved edges.

Also, for embodiments where the intermediate surface 133 includes a side surface 136, a stepped surface 137, and a base surface 139 such as shown in FIG. 2, the at least one protrusion 138 may extend or protrude from the side surface 136. For such embodiments, the at least one protrusion 138 extends over the stepped surface 137, such that one of the planar surfaces 140 of the at least one protrusion 138 faces in the same direction as the cord connecting surface (as previously described), and the other, opposing planar surface 142 faces the stepped surface 137.

FIG. 3A shows a perspective view of an example embodiment of the device-side connector 122 in more detail. As previously described, the device-side connector 122 may be integrated with, and/or be a component of, the housing 124 of the handle assembly 112, although other configurations may be possible. As shown in FIG. 3A, the device-side connector 122 includes an inner surface 144 defining a recess 146 configured to slidably receive at least a portion of the cord-side connector 120. For example, in the embodiment shown in FIG. 2, the stepped surface 137 may define a boundary between a first portion of the cord-side connector 120 configured to be disposed within the recess 146, and a second portion configured to be outside of the recess 146 when the cord-side connector 120 is connected to the device-side connector 122. Specifically, the first portion may include a portion of the housing 130 having the side surface 136 and the cord connecting surface 132, and the at least one protrusion 138. The second portion may include a portion of the housing 130 having the base surface 139. As shown in FIGS. 2 and 3A, in order for the recess 146 to slidably receive the cord-side connector 120, the recess 146 may have matching or complementary cross-sections perpendicular to the sliding direction.

In addition, the inner surface 144 may include a device connecting surface 148 that is configured to face the cord connecting surface 132 when the cord-side connector 120 is disposed in the recess 146. Similar to the cord connecting surface 132, the device connecting surface 148 may include, or is integrated with, a device-side conductive portion 150. When the cord-side connector 120 is disposed in the recess 146, the cord-side conductive portion 134 and the device-side conductive portion 150 physically contact each other to form the electrical connection between the cord 116 and the medical device 102. Accordingly, upon connection between the cord-side connector 120 and the device-side connector 122, the cord 116 supplies electrical power to the medical device 102 via the physical contact between the cord-side and device-side conductive portions 134, 150.

Figure 3B:
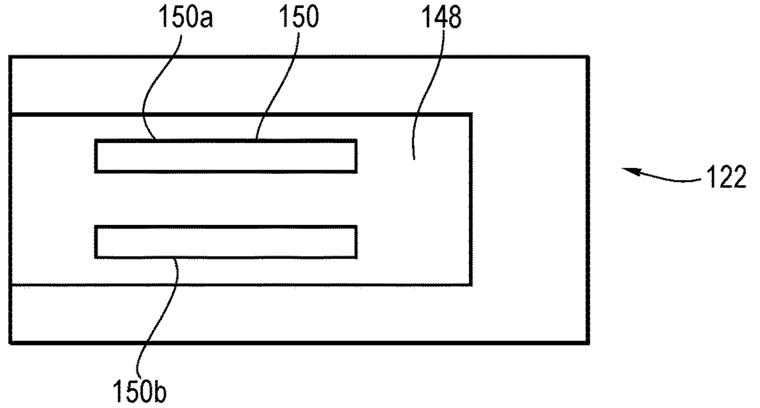
FIG. 3B shows a top view of the device-side connector of FIG. 3A.

Additionally, the cord-side conductive portion 134 and the device-side conductive portion 150 may have matching numbers of conductive elements for matching monopolar or bipolar configurations. Additionally, the cord-side conductive portion 134 and the device-side conductive portion 150 are correspondingly arranged in their respective surfaces 132, 148 so that conductive elements of the same type electrically contact each other. For example, as shown in FIG. 3B, the device-side conductive portion 150 includes two conductive elements 150*a*, 150*b* to contact the two conductive elements 134*a*, 134*b* on the cord side conductive portion 134 as shown in FIG. 2. Additionally, the conductive elements are arranged so that the active elements on the cord-side and the device-side contact each other, and return elements on the cord-side and the device-side contact each other, when the cord-side connector 120 is disposed in the recess 146. Similar configurations are possible for a monopolar configuration (e.g., where each of the cord-side conductive portion 134 and the device-side conductive portion 150 includes only one conductive element), and/or for a bipolar configuration that includes multiple return paths (e.g., where each of the cord-side conductive portion 134 and the device-side conductive portion 150 includes three conductive elements, one active element, and two return elements).

Figure 3C:
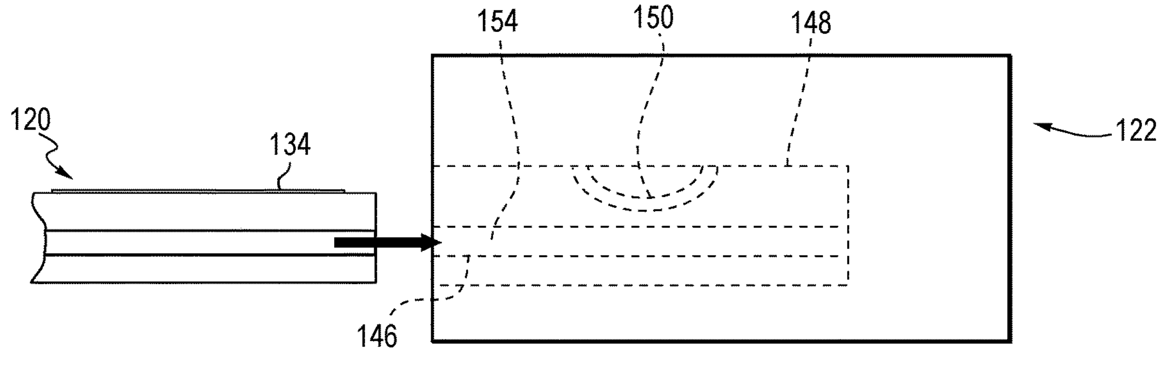
FIG. 3C shows a side view of the device-side connector of FIG. 3A.

For at least some embodiments such as shown in FIG. 3C, the elements of the device-side conductive portion 150 may be configured as spring-like members (e.g., including protruding electrode(s)), such as in the form of a flat spring, that protrude from the device connecting surface 148 in an unbiased state. When the cord-side connector 120 moves within the recess 146, the cord-side conductive portion 134 physically contacts the protruding device-side conductive portion 150, in turn providing a counter bias against the device-side conductive portion 150. This, in turn, causes the device-side conductive portion 150 to move toward the device connecting surface 148. Configuring the elements of the device-side conductive portion 150 as protruding spring-like members may ensure maintenance of sufficient contact between the cord-side and device-side conductive portions 134, 150.

The inner surface 144 may further include a guiding portion 152 defining at least one slot/guiding surface portion 154 configured to slidably receive the at least one protrusion 138. The number and arrangement of the at least one slot 154 may correspond to the number and arrangement of the at least one protrusion 138. For example, as shown in FIG. 3A, the at least one slot 154 includes two slots 154*a*, 154*b* positioned so that each slot 154*a*, 154*b* receives a corresponding one of the protrusions 138*a*, 138*b*.

To connect the cord-side connector 120 to the device-side connector 122, each protrusion 138*a*, 138*b* slidably engages with a respective guiding portion 152*a*, 152*b* and moves within a corresponding slot 154*a*, 154*b* in the cord-attachment direction. The slots 154*a*, 154*b* function as tracks that direct or guide the protrusions 138*a*, 138*b* in the sliding direction. The protrusions 138*a*, 138*b* slidably move within respective slots 154*a*, 154*b* until the cord-side connector 120 reaches a stopped position within the recess 146, at which point the cord-side conductive portion 134 and the device-side conductive portion 150 are in physical contact with each other.

The stopped position may be determined by a stop portion 156 of the guiding surface portion 154 that prevents further movement of the protrusions 138*a*, 138*b* in the cord attachment direction. Additionally or alternatively, the stopped position may be determined by a threshold frictional force between the guiding portion 152 and the protrusions 138*a*, 138*b*. The threshold frictional force may be an amount of force that prevents the cord-side connector 120 from separating from the device-side connector 122 unless a force greater than the frictional force is applied to the cord-side connector 120 in the cord detachment direction. In general, the threshold frictional is sufficiently great enough to prevent the cord-side connector 120 from easily sliding out of the recess 146 such as due to gravity, but small enough that it can be overcome by a human applying natural force to the cord-side connector 120 in the cord-detachment direction without risk of breaking the cord 116 or the medical device 102.

For at least some example embodiments, the at least one protrusion 138 may form an interference or friction fit with the at least one slot 154 in order to create the threshold frictional force between them. To do so, the at least one slot 154 and the at least one protrusion 138 may have about the same size as each other, with the at least one slot 154 slightly smaller in order to create sufficient contact and friction between the protrusion 138 and the guiding surface 152. The at least one protrusion 138 may be made of an elastic material that allows it to flex to form the friction fit while it moves within the slot 154 in the cord-attachment direction.

In some example configurations, such as shown in FIG. 3A, each slot 154*a*, 154*b* may have a substantially constant cross-sectional area over its length in the sliding direction. FIGS. 4A, 4B show another example embodiment where the slot 154 is tapered in the cord-attachment direction 121, such that the cross-sectional area of the slot 154 decreases in the cord-attachment direction 121. The tapered configuration may facilitate attachment and detachment of the cord-side connector 120 to/from the device-side connector 122 by providing a variable amount of frictional force over the length of the slot 154, e.g., by providing a smaller amount of frictional force the less the protrusion 138 is within the slot 154, and providing an increasing amount of the frictional force the more the protrusion 138 is within the slot 154.

Figure 5A:
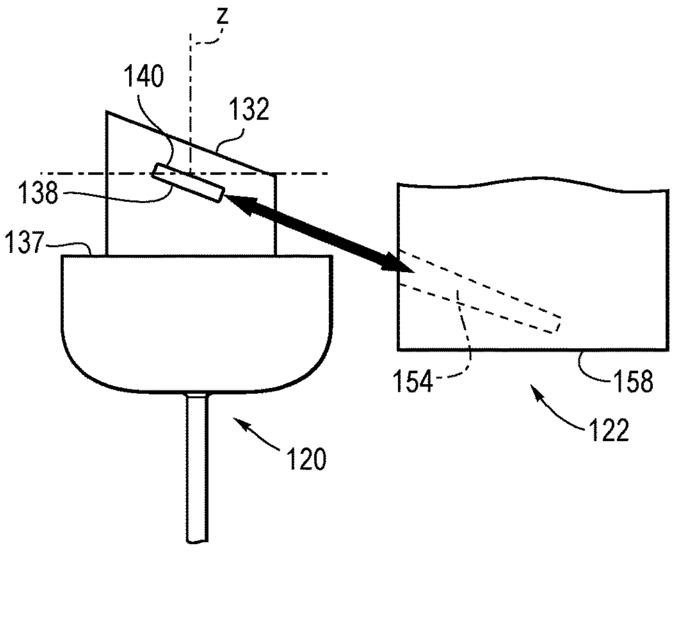
FIG. 5A shows another embodiment of a cord-side connector and a device-side connector disconnected from each other.
Figure 5B:
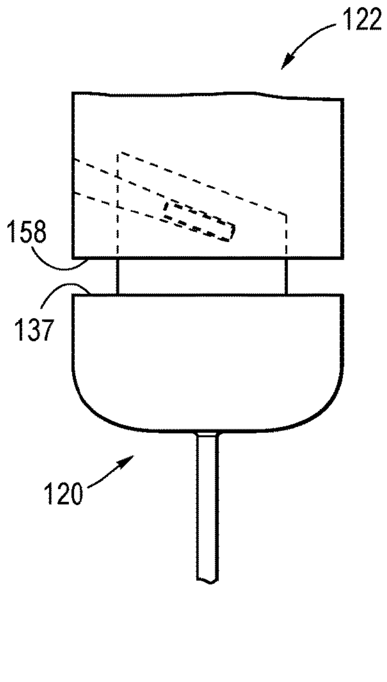
FIG. 5B shows the cord-side connector and the device-side connector of FIG. 5A connected to each other.

FIGS. 5A and 5B show another example embodiment of the cord-side connector 120 and the device-side connector 122. The embodiment in FIGS. 5A, 5B alters the angle of the sliding direction relative to the device-side connector 122, which may desirably make disconnection of the cord-side connector 120 from the device-side connector 122 more difficult compared to the embodiments of FIGS. 2-4B for at least some situations. As shown in FIG. 5A, the cord-side connector 120 may have a central (z) axis, and the cord connecting surface 132 may extend at an angular offset from being perpendicular to the central axis. The planar surface 140 of the protrusion 138 may face in the same direction as the cord connection surface 132 according to the same angular offset. On the device side, the device-side connector 122 may have a base surface 158 that faces the stepped surface 137 when the cord-side connector 120 is connected to the device-side connector 122, as shown in FIG. 5B. The at least one slot 154 may correspondingly extend in the sliding direction at the same angular offset relative to the base surface 158, rather than parallel to the base surface 158.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. A system for electrically and mechanically connecting an electrical cord and a medical device, the system comprising:

a cord-side connector including:

a cord connecting surface including a cord-side conductive portion, an intermediate surface extending from the cord connecting surface to an end of an elongate member of the electrical cord, and at least one protrusion extending from the intermediate surface; and a device-side connector including:

a device connecting surface including a device-side conductive portion, and a recess configured to slidably receive the cord-side connector in a sliding direction, the recess including at least one slot configured to slidably receive the at least one protrusion to guide the cord-side connector in the recess in the sliding direction, wherein the at least one protrusion and the at least one slot are configured to form a mechanical connection through an interference fit upon slidable receipt of the at least one protrusion into the at least one slot, and the cord-side conductive portion and the device-side conductive portion are configured to be in contact with each other upon formation of the interference fit.

2. The system of claim 1, wherein the cord connecting surface extends at an angular offset from being perpendicular to a central axis.

3. The system of claim 1, wherein the at least one protrusion comprises a pair of opposing planar surfaces oriented parallel with the cord connecting surface.

4. The system of claim 1, wherein the at least one protrusion extends in a direction perpendicular to the sliding direction.

5. The system of claim 1, wherein the at least one protrusion is made of an elastic material.

6. The system of claim 1, wherein the device-side conductive portion comprises a protruding electrode.

7. The system of claim 6, wherein the protruding electrode is configured as a spring-like member.

8. The system of claim 1, wherein the at least one slot is tapered.

9. The system of claim 1, wherein the intermediate surface comprises a side surface and a stepped surface, the side surface extending from the cord connecting surface to the stepped surface, wherein the at least one protrusion extends from the side surface, and wherein the at least one protrusion comprises a planar surface that faces the stepped surface.

10. The system of claim 9, wherein the stepped surface is parallel with the cord connecting surface.

11. The system of claim 9, wherein the intermediate surface further comprises a base surface that extends from the stepped surface to the end of the elongate member of the electrical cord.

12. The system of claim 1, wherein the at least one protrusion comprises semi-circular or a semi-elliptical contour over a direction in which the at least one protrusion extends from the intermediate surface.

* * * * *